F. P. PFLEGHAR.
MECHANICAL SEAL.
APPLICATION FILED JUNE 2, 1914.

1,126,268.

Patented Jan. 26, 1915.

Witnesses:-
Hyperion Barry.
F. George Barry.

Inventor:-
Frank P. Pfleghar
by his attorneys
Brown & Seward

UNITED STATES PATENT OFFICE.

FRANK P. PFLEGHAR, OF NEW HAVEN, CONNECTICUT.

MECHANICAL SEAL.

1,126,268. Specification of Letters Patent. Patented Jan. 26, 1915.

Application filed June 2, 1914. Serial No. 842,376.

*To all whom it may concern:*

Be it known that I, FRANK P. PFLEGHAR, a citizen of the United States, and resident of New Haven, in the county of New Haven and State of Connecticut, have invented a new and useful Improvement in Mechanical Seals, of which the following is a specification.

My invention relates to a mechanical seal, with the object in view of providing a simple and effective seal which may be securely and quickly locked and which will be very cheap to manufacture.

Another object is to provide certain improvements in the form and arrangement of the device whereby the above mentioned and other objects may be effectively carried out.

My seal can be produced at a very slight cost owing to its simplicity and to the fact that it is struck from a single piece of metal.

Figure 1:
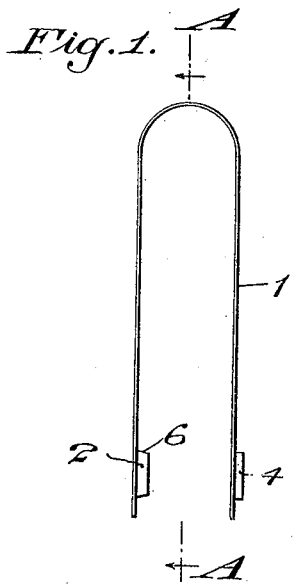
Figure 2:
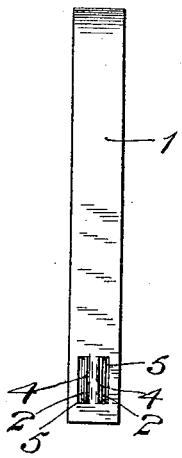
Figure 3:
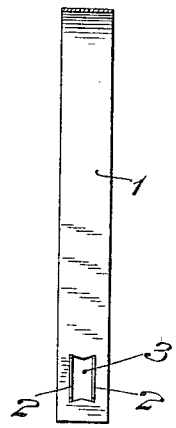
Figure 4:
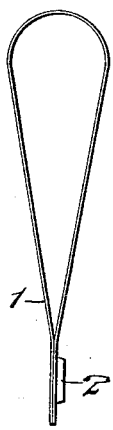
Figure 5:
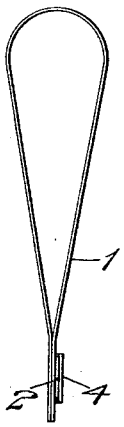
Figure 6:
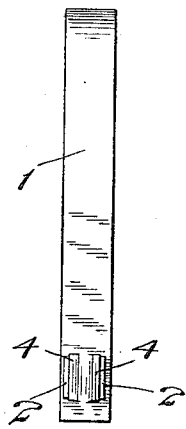
Figure 7:
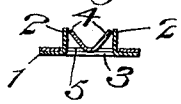
Figure 8:
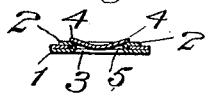

A practical embodiment of the invention is represented in the accompanying drawings, in which, Figure 1 represents a view of the seal in side elevation with the ends separated. Fig. 2 represents an elevation taken at right angles to Fig. 1. Fig. 3 represents a section taken in the plane of the line A—A of Fig. 1, looking in the direction of the arrows. Fig. 4 represents a view in side elevation, showing the parts when in position for locking. Fig. 5 represents a similar view with the parts locked. Fig. 6 represents an elevation taken at right angles to Fig. 5, with the parts in the same position. Fig. 7 represents an enlarged detail section of the locking means, showing the parts in position before they are locked, and Fig. 8 represents a similar view showing the parts locked.

The body of the seal consists of a long thin metallic strip 1, which is adapted to be bent upon itself at its central portion. One end of the strip 1 is provided with upturned lips or ears 2, which are formed by stamping out the metal from the strip 1, thus leaving between them the orifice or opening 3.

The ears 2 are substantially parallel, and when the strip 1 is bent upon itself, they extend inwardly toward the other end of the said strip. The other end of the strip 1 is provided with a pair of ears 4, extending laterally from said strip in the same direction as the ears 2. The ears 4 diverge from a common base integral with the strip 1, and are formed by stamping out the metal of the strip 1, thus leaving on either side, openings or slots 5.

The ears 2 are tapered outwardly, as shown at 6, so as to insure ready insertion into the slots 5.

In operation, when it is desired to lock the seal, the strip 1 is bent upon itself at its central portion, and the ears 2 inserted in the slots 5, so as to bring the ears 2 adjacent to the ears 4. A seal press or ordinary pliers may now be used to press or fold the ears into locked position. It will readily be seen that in this position the ears 2 are oppositely bent down or folded down on to the strip 1 and the ears 4 are likewise bent down on to the turned-over ears 2, as shown in Fig. 8, thus securely locking the ends of the strip 1 together.

It is evident that various changes may be made in the form, construction and arrangement of the device without departing from the scope and spirit of my invention and hence I do not wish to limit myself strictly to the structure herein shown and described.

What I claim is:

An article of the class described comprising a strip of thin flexible material, one end of said strip having a plurality of ears with an aperture therebetween and the other end of said strip having a plurality of contiguous ears with an aperture on each side thereof, whereby the first mentioned ears may be passed through the last mentioned apertures and all the ears folded down on the strip with the last mentioned ears on top of the first mentioned ears, for locking the strip in loop form.

In testimony, that I claim the foregoing as my invention, I have signed my name, in presence of two witnesses, this 28th day of May, 1914.

FRANK P. PFLEGHAR.

Witnesses:
FRANCES I. MARTIN,
H. W. IBELSHAUSER.

Copies of this patent may be obtained for five cents each, by addressing the "Commissioner of Patents, Washington, D. C."